United States Patent
Takahashi (10) Patent No.: US 9,199,325 B2
(45) Date of Patent: Dec. 1, 2015

(54) WIRE ELECTRIC DISCHARGE MACHINE PERFORMING DISTORTION REMOVING MACHINING

(71) Applicant: FANUC CORPORATION, Yamanashi (JP)

(72) Inventor: Shouji Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 31 days.

(21) Appl. No.: 13/688,618

(22) Filed: Nov. 29, 2012

(65) Prior Publication Data

US 2013/0206731 A1    Aug. 15, 2013

(30) Foreign Application Priority Data

Feb. 15, 2012    (JP) ................................. 2012-030247

(51) Int. Cl.
| | |
|---|---|
| *B23H 1/02* | (2006.01) |
| *B23H 7/20* | (2006.01) |
| B23H 7/06 | (2006.01) |

(52) U.S. Cl.
CPC .. *B23H 1/02* (2013.01); *B23H 7/20* (2013.01); *B23H 7/065* (2013.01); *B23H 2600/12* (2013.01)

(58) Field of Classification Search
CPC ............. H23H 1/02; H23H 7/02; H23H 7/20; H23H 7/065; B23H 1/02; B23H 2600/12; B23H 7/065; B23H 7/20
USPC .......... 219/69.12, 69.13, 69.14, 69.11, 69.15, 219/69.16, 69.17; 700/162
See application file for complete search history.

(56) References Cited

U.S. PATENT DOCUMENTS

| | | | |
|---|---|---|---|
| 4,521,662 A | 6/1985 | Kinoshita et al. | |
| 4,970,362 A | 11/1990 | Ono | |
| 5,302,796 A * | 4/1994 | Kuriki | ........................ 219/69.12 |
| 5,451,737 A * | 9/1995 | Bertholds et al. | .......... 219/69.12 |
| 5,852,269 A * | 12/1998 | Toyonaga et al. | .......... 219/69.12 |

(Continued)

FOREIGN PATENT DOCUMENTS

| | | |
|---|---|---|
| JP | 55-137834 A | 10/1980 |
| JP | 5621733 A | 2/1981 |

(Continued)

OTHER PUBLICATIONS

Japanese Office Action with English translation dated Apr. 16, 2013 (6 pages).

*Primary Examiner* — Dana Ross
*Assistant Examiner* — James Sims, III
(74) *Attorney, Agent, or Firm* — HAUPTMAN HAM, LLP (57) ABSTRACT

When contact between a wire electrode and a workpiece is detected while, after wire electric discharge machining is ended, the wire electrode is moved (retraced) in the direction opposite to the machining direction along the machining path, the movement of the wire electrode is stopped. The wire electrode is moved in the offset direction from the contact position. When the wire electrode and the workpiece are brought into a non-contact state, the non-contact state is detected, and the movement of the wire electrode is stopped. The wire electrode is returned from the non-contact position to the machining path, and the wire electrode is retraced along the machining path in the state where the detection of contact between the wire electrode and the workpiece is neglected. Then, an amount of distortion of the workpiece is calculated from the contact position and the non-contact position.

5 Claims, 6 Drawing Sheets

(56) References Cited

U.S. PATENT DOCUMENTS

| | | | |
|---|---|---|---|
| 5,935,456 A * | 8/1999 | Braunschweiler et al. | 219/69.12 |
| 6,225,589 B1 * | 5/2001 | Bartok | 219/69.15 |
| 6,815,630 B1 * | 11/2004 | Ishihara et al. | 219/69.12 |
| 7,054,712 B2 * | 5/2006 | Murai et al. | 700/162 |
| 7,211,762 B2 * | 5/2007 | Kinoshita | 219/69.12 |
| 8,404,991 B2 * | 3/2013 | Kasai et al. | 219/69.14 |
| 2006/0091113 A1 * | 5/2006 | Hiraga et al. | 219/69.12 |
| 2007/0119821 A1 * | 5/2007 | Kaneko | 219/69.12 |
| 2012/0037601 A1 * | 2/2012 | Watanabe et al. | 219/69.17 |

FOREIGN PATENT DOCUMENTS

| | | |
|---|---|---|
| JP | 57114328 A | 7/1982 |
| JP | 07136855 A | 5/1995 |
| JP | 63267121 A | 11/1998 |
| JP | 11207528 A | 8/1999 |

* cited by examiner

WIRE ELECTRIC DISCHARGE MACHINE PERFORMING DISTORTION REMOVING MACHINING

RELATED APPLICATIONS

The present application claims priority from Japanese Application No. 2012-030247 filed Feb. 15, 2012, the disclosure of which is hereby incorporated by reference herein in its entirety.

BACKGROUND OF THE INVENTION

1. Field of the Invention

The present invention relates to a wire electric discharge machine performing distortion removing machining.

2. Description of the Related Art

When a workpiece made of a material having a comparatively large internal stress is subjected to wire electric discharge machining, the internal stress is released according to the progress of machining, and thereby distortion is caused in the workpiece. This distortion causes a machining dimension error, so as to adversely affect the machining accuracy and the machining time. In the conventional machining method, when a material having a comparatively large internal stress is subjected to wire electric discharge machining, a machining process causing distortion is performed so as to leave a machining margin corresponding to an anticipated amount of the distortion, and then a machining process to remove the distortion is performed (see, for example, Japanese Patent Application Laid-Open No. 55-137834).

However, the amount of distortion, and the portion of the workpiece, in which portion the distortion is caused, are not known before the machining process, and hence the anticipated machining margin needs to be set large. For this reason, rough machining is performed twice, and hence machining time is significantly increased. In the case of machining a mold, single-piece machining is performed in many cases, and hence the conventional machining method causes almost no problem. However, in some cases of machining a machine component and an electrical component, a large number of components having the same shape are machined. In these cases, machining time is significantly increased, and hence a machining method which can reduce the machining time is desired.

SUMMARY OF THE INVENTION

Accordingly, an object of the present invention is to provide a wire electric discharge machine performing distortion removing machining, the wire electric discharge machine being capable of performing identification of a portion of a workpiece in which portion distortion is caused by wire electric discharge machining of the workpiece, and further being capable of performing estimation of the amount of the distortion, efficient machining, and reduction in the machining time.

A wire electric discharge machine performing distortion removing machining, according to the present invention, is configured by attaching a function of performing distortion removing machining to a wire electric discharge machine which performs machining of a workpiece by moving, relatively to the workpiece, a wire electrode supported by upper and lower wire guides, and is featured by including: an axial movement control portion which is configured, after the machining is ended, to move, relatively to the workpiece, the wire electrode from the machining end position to the machining start position along the machining path in the direction opposite to the machining direction; a contact detection portion which is configured to detect contact between the wire electrode and the workpiece at the time when the wire electrode is moved in the direction opposite to the machining direction relatively to the workpiece; a contact position storage portion which is configured, when contact between the wire electrode and the workpiece is detected by the contact detection portion, to stop the relative movement of the wire electrode, so as to store, as a contact position, the position of the wire electrode with respect to the workpiece at the time of detection of the contact; a non-contact position storage portion which is configured, after the contact position of the wire electrode is stored, to move the wire electrode in the offset direction relatively to the workpiece, and is configured, when the wire electrode and the workpiece are brought into a non-contact state, to detect the non-contact state, and to stop the relative movement of the wire electrode, so as to store, as a non-contact position, the position of the wire electrode with respect to the workpiece at the time of detection of the non-contact state; a machining path return control portion which is configured to move, relatively to the workpiece, the wire electrode in the direction opposite to the offset direction from the non-contact position, and is configured to move, relatively to the workpiece, the wire electrode in the direction opposite to the machining direction along the machining path by a predetermined distance while neglecting the detection of contact between the wire electrode and the workpiece by the contact detection portion; a distortion amount calculation portion which is configured to calculate an amount of distortion of the workpiece from the contact position stored in the contact position storage portion, and the non-contact position stored in the non-contact position storage portion; and a distortion removing machining execution portion which is configured to perform distortion removing machining at the time when a maximum value of the amounts of distortion calculated by the distortion amount calculation portion is larger than a value set beforehand.

The wire electric discharge machine performing the distortion removing machining can further include a speed changing portion which can arbitrarily change the feed speed of the wire electrode at the time when the wire electrode is moved, relatively to the workpiece, from the machining end position to the machining start position along the machining path in the direction opposite to the machining direction.

The wire electric discharge machine performing the distortion removing machining may further include a stopping portion which stops the wire electrode at every predetermined distance at the time when the wire electrode is moved, relatively to the workpiece, from the machining end position to the machining start position along the machining path in the direction opposite to the machining direction.

The wire electric discharge machine performing the distortion removing machining may include a moving portion which moves the wire electrode to the machining start position in the case where, when the wire electrode is moved in the offset direction relatively to the workpiece, the contact between the wire electrode and the workpiece cannot be released.

The wire electric discharge machine performing the distortion removing machining may include a moving portion which, in machining a plurality of components successively from the workpiece, moves the wire electrode to the machining start position of a component to be machined subsequently to the currently machined component, in the case where the contact between the wire electrode and the workpiece cannot be released at the time when the wire electrode is moved in the offset direction relatively to the workpiece.

With the present invention, it is possible to provide a wire electric discharge machine that is capable of performing identification of a portion of a workpiece, in which portion distortion is caused by wire electric discharge machining of the workpiece, and is also capable of performing estimation of the amount of the distortion, efficient machining, and reduction in the machining time.

BRIEF DESCRIPTION OF THE DRAWINGS

The above and other objects and features of the present invention will be more apparent from the following description of the preferred embodiments with reference to the accompanying drawings, wherein.

DETAILED DESCRIPTION OF THE PREFERRED EMBODIMENTS

Figure 1:
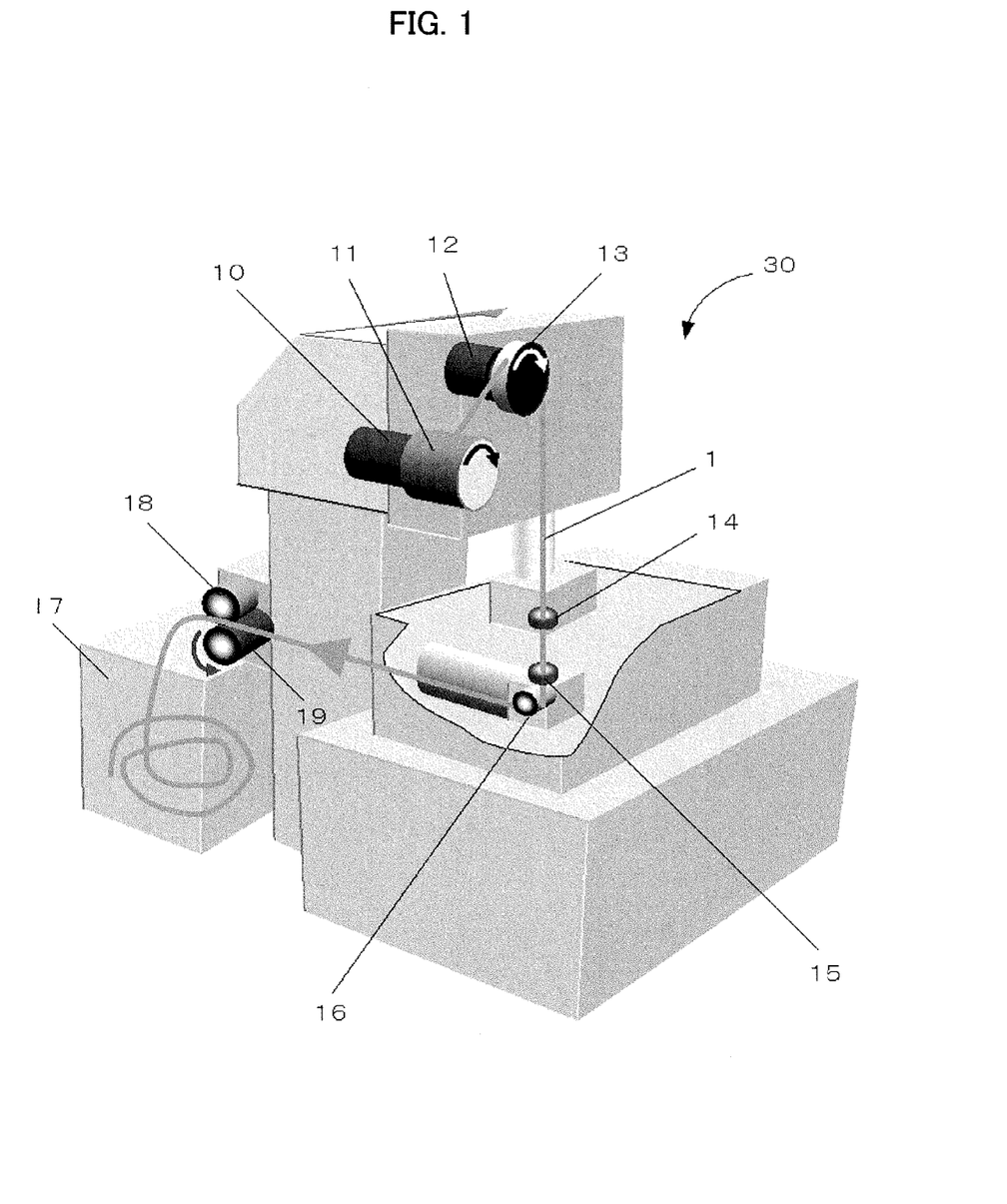
FIG. 1 is a view showing a schematic configuration of a main body of a wire electric discharge machine to which the present invention is applied.

The outline of the configuration of a main body 30 of a wire electric discharge machine, to which the present invention is applied, will be described with reference to FIG. 1.

By a torque motor 10 of a feed portion, a predetermined small amount of torque directed in the direction opposite to the drawing direction of a wire electrode 1 is applied to a wire bobbin 11 with the wire electrode 1 wound therearound. The wire electrode 1 fed out from the wire bobbin 11 is made to pass through a plurality of guide rollers (not shown), and the tension of the wire electrode 1 between a brake shoe 13 driven by a brake motor 12 and a feed roller 19 driven by a wire electrode feed motor (not shown) is adjusted by the brake shoe 13.

After passing through the brake shoe 13, the wire electrode 1 is made to pass through an upper wire guide 14, a lower wire guide 15, and a lower guide roller 16, and is sandwiched between a pinch roller 18 and the feed roller 19 driven by the wire electrode feed motor (not shown) so as to be collected in a wire electrode collection box 17.

Figure 2:
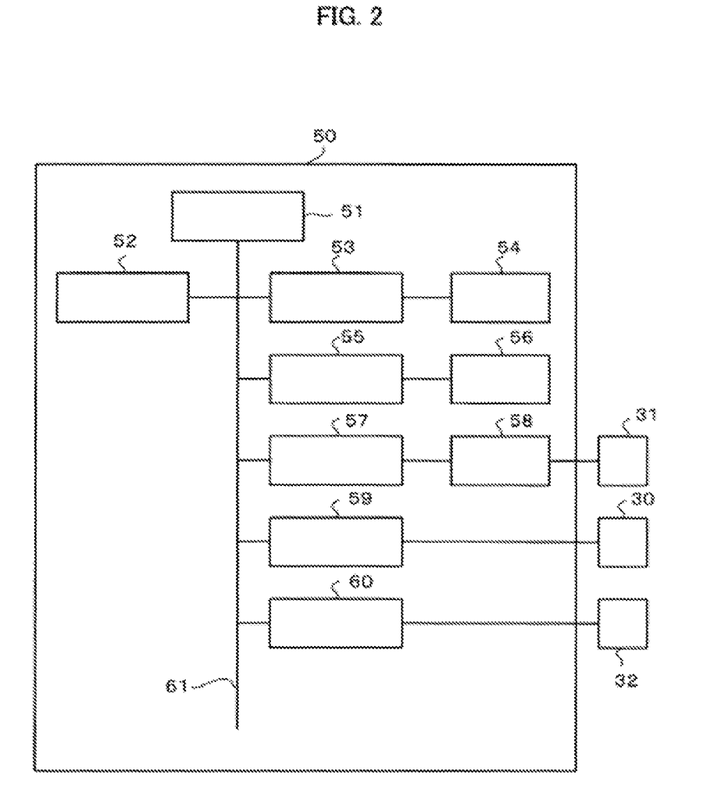
FIG. 2 is a view showing a schematic configuration of a numerical controller which controls the main body of the wire electric discharge machine shown in FIG. 1.

FIG. 2 is a view showing a schematic configuration of a numerical controller which controls the main body of the wire electric discharge machine shown in FIG. 1.

A numerical controller (CNC) 50 includes a processor (CPU) 51, a memory 52, such as RAM and ROM, a display interface 53, a display device 54, a keyboard interface 55, a keyboard 56, a servo interface 57, a servo amplifier 58, and an input/output interface 60 performing transmission and reception of a signal to and from an external device. These components are connected to each other via a bus 61. A servo motor 31, which drives each of shafts for moving the wire electrode 1 and a workpiece 2 relatively to each other, is driven by the servo amplifier 58. The main body 30 of the wire electric discharge machine, which main body includes the machining power source, is controlled via an interface 59.

When a machining program is started, the machining power source is instructed to be turned on via the interface 59. Also, when the machining power source is turned off, the main body 30 of the wire electric discharge machine is instructed via the interface 59. Input and output signals are transmitted from and to an input/output device 32 via the input/output interface 60. The wire electric discharge machine, which is configured by the numerical controller 50 and the wire electric discharge machine main body 30, includes means for detecting contact and non-contact states between the wire electrode 1 and the workpiece 2 by detecting a small change in the voltage applied between the wire electrode 1 and the workpiece 2. Providing such contact and non-contact detection means in a wire electric discharge machine is a known technical matter, and hence detailed description thereof is omitted.

In the following, the distortion removing machining in the wire electric discharge machine according to the present invention will be described.

The conventional problem is that the portion where distortion is caused in a workpiece and the amount of the distortion are not known. In order to solve this problem, an efficient distortion removing machining method is performed in such a manner that a portion where distortion is caused is identified, and that a maximum value of the amounts of the distortion is calculated, and on the basis of the maximum value, distortion removing machining is selected.

The machining path subjected to the machining has a width obtained by adding the discharging gap to the wire diameter. For this reason, when the wire electrode is returned (which is hereinafter referred to as "retrace") in the opposite direction to the machining direction, from the machining stop position to the machining start position along the machining path subjected to the machining, the workpiece and the wire electrode are normally not brought into contact with each other. The retrace function is provided in the wire electric discharge machine described above. The retrace function is known, and hence is not described in detail.

However, when a workpiece having a comparatively large internal stress is subjected to wire electric discharge machining so that, according to the progress of the machining, the internal stress is released to cause distortion in the workpiece, the workpiece is displaced from the machining path by the distortion.

In the case where the retrace is performed in the state where the workpiece is displaced from the machining path, when the displacement is large, the wire electrode is brought into contact with the workpiece in some portions during the retrace. On the contrary, even in the case where the workpiece is displaced from the machining path due to the distortion, or the like, when the displacement is small, the wire electrode is not brought into contact with the workpiece during the retrace.

From the above, on the basis of whether or not the wire electrode is brought into contact with the workpiece during the retrace, it is possible to discriminate whether or not the displacement (distortion) of the workpiece is large. When the wire electrode is brought into contact with the workpiece during the retrace, the contact is released by shifting the wire electrode from the machining path, and the amount of the distortion can be obtained from the moving distance required to release the contact.

Therefore, in the present invention, in the case where, when the retrace is performed by a program instruction after rough machining, the workpiece and the wire electrode are not brought into contact with each other, it is determined that the amount of distortion of the workpiece is small, and a subsequent machining process determined beforehand is performed. On the other hand, in the case where, when the retrace is performed by the program instruction after rough machining, the workpiece and the wire electrode are brought into contact with each other, the movement of the wire electrode is temporarily stopped at the position where the contact is detected, and the position where the contact is detected is stored. Further, the wire electrode is automatically shifted in the offset direction, and the position where the workpiece and the wire electrode are separated from each other is stored as a non-contact position. Then, the wire electrode is returned to the machining path from the position shifted in the offset direction. When the wire electrode is returned to the machining path, the wire electrode is brought into contact with the workpiece, because before being shifted in the offset direction, the wire electrode was brought into contact with the workpiece on the machining path.

When the retrace is resumed in the state where the wire electrode is returned onto the machining path (that is, in the state where the workpiece and the wire electrode are brought into contact with each other), the contact between the workpiece and the wire electrode is immediately detected, and the amount of distortion is again obtained. Thereby, at the position where the wire electrode is returned from the position shifted in the offset direction to the machining path, the resumption of retrace→the detection of contact→the acquisition of the amount of distortion→the returning to the machining path→the resumption of retrace→the detection of contact→ . . . are repeated, and hence the retrace is no longer advanced.

In order to avoid such a situation, the retrace is performed by a predetermined distance by neglecting the detection of contact between the workpiece and the wire electrode, after the operations in which the contact between the workpiece and the wire electrode is detected (the contact position is stored), and in which the amount of distortion is calculated (the position (non-contact position) where the contact is released by shifting, in the offset direction, the wire electrode brought into contact with the workpiece is detected), and then the wire electrode is returned onto the machining path. After the retrace of the wire electrode is performed by the predetermined distance in the state where the detection of contact between the workpiece and the wire electrode is neglected, the wire electrode is temporarily stopped, and the contact between the workpiece and the wire electrode is checked (the contact position is stored). As a result, when the wire electrode is not brought into contact with the workpiece, the process is returned to the normal retrace operation (in which the detection of contact is performed). On the other hand, when the wire electrode is brought into contact with the workpiece, the contact releasing operation is performed similarly to the above, and the position (non-contact position) where the contact is released by shifting the wire electrode in the offset direction is detected. The wire electrode is returned to the machining start position while such operations are repeated. Then, the amount of distortion is calculated from one or a plurality of the contact positions and the non-contact positions which are stored, and thereby a maximum amount of distortion is obtained. Note that the position of the wire electrode or the workpiece, which position is stored as a contact position, is located on the machining path, and hence the amount of distortion may be calculated by using the non-contact position and the machining path at the time when the wire electrode and the workpiece is brought into contact with each other.

There is a case where, depending on the amount of distortion, the machining groove is closed, or the wire is disconnected at the time of retrace, and thereby the contact between the workpiece and the wire electrode cannot be released. In this case, it is determined that the calculation of the amount of distortion is impossible, and the retrace is stopped. Then, the wire electrode is moved to the next machining start position. The distortion removing machining is selected according to the maximum value of the calculated amounts of distortion. The amounts of distortion are calculated, and according to the maximum value of the amounts of distortion, the distortion removing machining is selected so as to enable suitable machining to be performed. Thereby, efficient machining can be performed, so that the machining time can be reduced.

Figure 3:
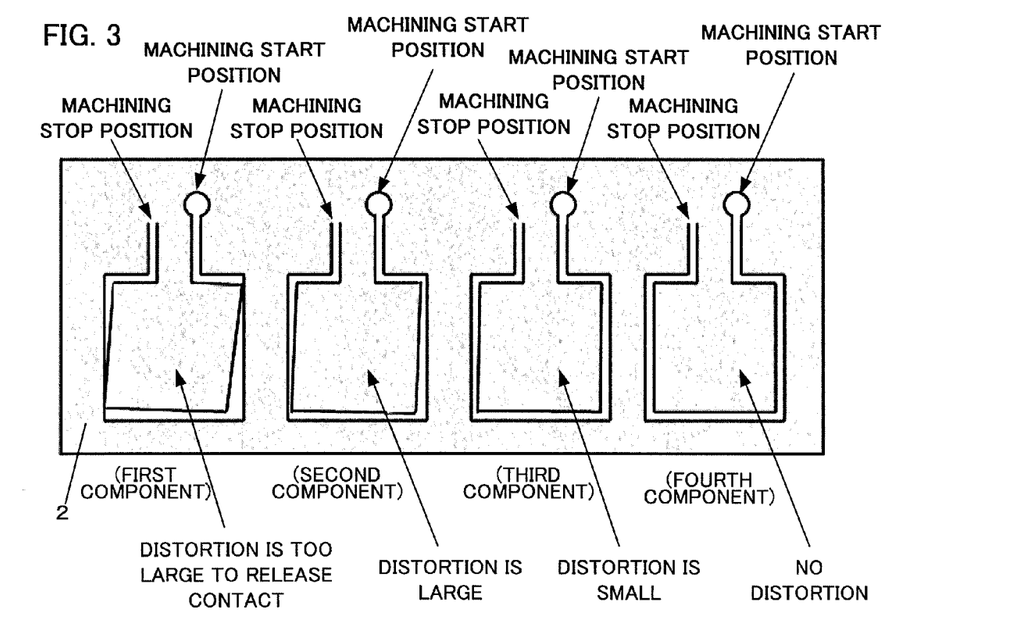
FIG. 3 is a view explaining a case where the same machining shape is formed at four portions of a workpiece having comparatively large internal stress.
Figure 4:
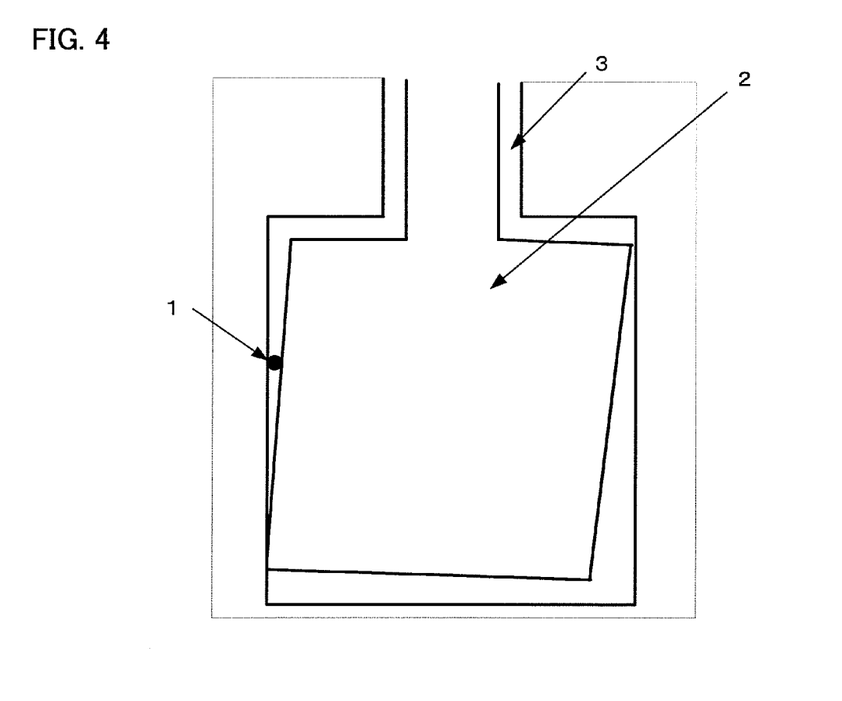
FIG. 4 is a view explaining a state where contact between a wire electrode and a workpiece cannot be released.
Figure 5:
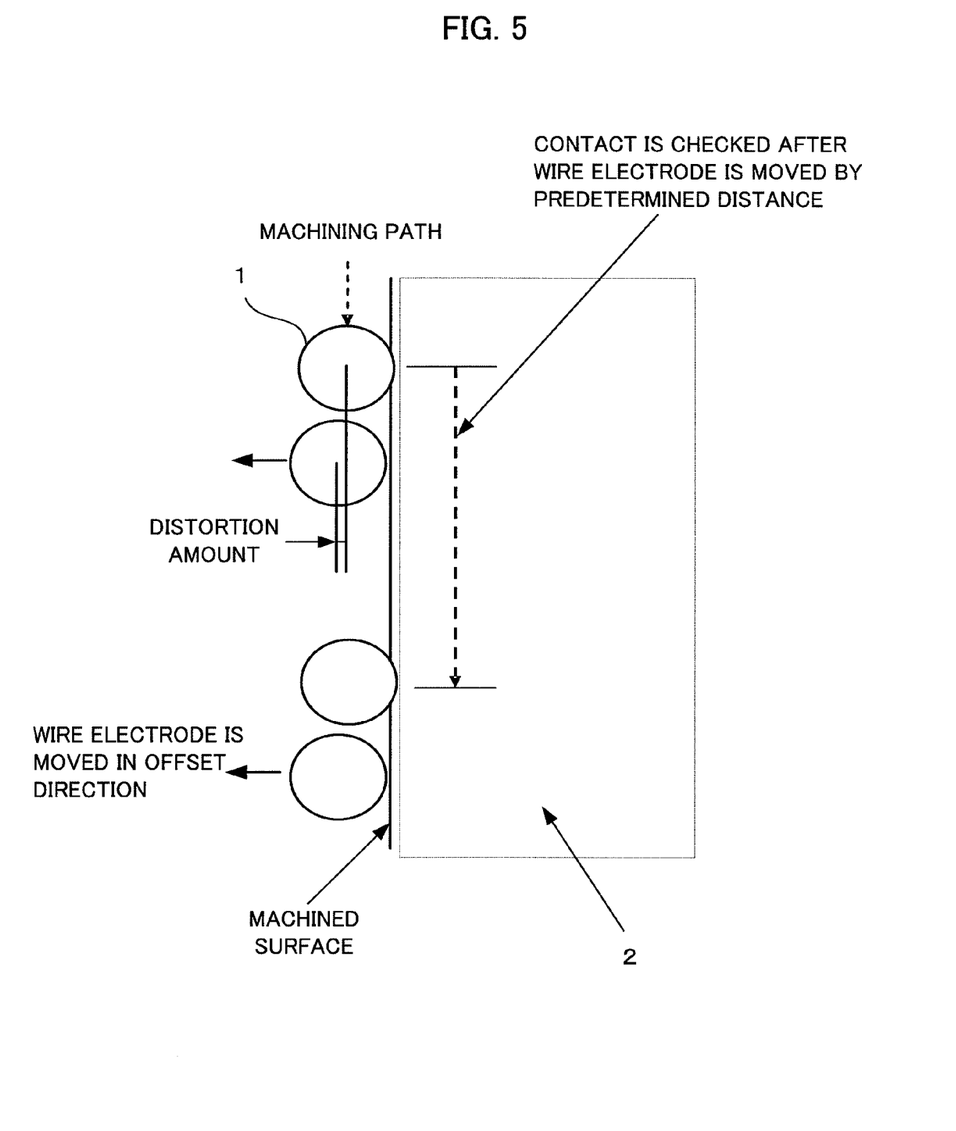
FIG. 5 is a view explaining a method for obtaining a distortion amount.

Next, the machining method according to the present invention will be described with reference to FIG. 3, FIG. 4 and FIG. 5. FIG. 3 is a view explaining a case where the same machining shape is formed at four portions of a workpiece having a comparatively large internal stress. FIG. 4 is a view explaining a state where a contact between a wire electrode and a workpiece cannot be released. FIG. 5 is a view explaining a method for calculating a maximum value of distortion amounts.

As shown in FIG. 3, the same machining shape is formed at four portions of the workpiece 2 having a comparatively large internal stress. After first rough machining is ended, contact between the workpiece 2 and the wire electrode is detected during the retrace. As shown in FIG. 4, the retrace of the wire electrode is temporarily stopped at the position where the workpiece 2 and the wire electrode 1 are brought into contact with each other. The contact between the workpiece 2 and the wire electrode 1 is not released even when the wire electrode 1 is shifted from the contact position in the offset direction, and hence the retrace of the wire electrode 1 is interrupted and is moved to the next machining start position.

Rough machining is performed from the second machining start position, and after the rough machining is ended, contact between the workpiece 2 and the wire electrode 1 is detected during the retrace. The retrace of the wire electrode is temporarily stopped at the position where the workpiece 2 and the wire electrode 1 are brought into contact with each other. The contact position is stored. Then, the wire electrode is shifted in the offset direction from the contact position on the workpiece. Then, the position, at which the contact between the workpiece 2 and the wire electrode 1 is released, is stored, and the wire electrode 1 is returned to the machining path.

When the wire electrode 1 is returned to the machining path, the wire electrode 1 is brought into contact with the workpiece 2, because before being shifted in the offset direction, the wire electrode 1 was brought into contact with the workpiece 2 on the machining path. For this reason, after the retrace is performed by a predetermined distance by neglecting the detection of contact between the wire electrode 1 and the workpiece 2, the wire electrode is temporarily stopped. Then, contact between the wire electrode 1 and the workpiece 2 is checked. As a result, when contact between the wire electrode 1 and the workpiece 2 is not detected, the process is returned to the normal retrace operation (in which the detection of contact is performed). On the other hand, when contact between the workpiece 2 and the wire electrode 1 is detected, the wire electrode 1 is temporarily stopped at the position where the contact between the wire electrode 1 and the workpiece 2 is detected, and the contact position is stored. Then, the position (non-contact position) where the contact between the wire electrode 1 and the workpiece 2 is released by shifting the wire electrode 1 in the offset direction is stored, and then the wire electrode 1 is returned to the machining path.

After the wire electrode 1 is returned to the machining start position by repeating this operation, a maximum value of the amounts of distortion is calculated (see FIG. 5). As a result of calculation, when the maximum value of the amounts of distortion is large, the distortion removing machining is performed, and then the finish machining is performed. After the finish machining is ended, the wire electrode 1 is moved to the next machining start hole.

In the third machining, although the maximum value of the amounts of distortion is calculated, the maximum value is small, and hence the predetermined finish machining is performed. After the finish machining is ended, the wire electrode 1 is moved to the next machining start hole. Further, in the fourth machining, while the retrace is performed, the workpiece 2 and the wire electrode 1 are not brought into contact with each other. Therefore, the predetermined finish machining is performed, so that all the machining processes are completed.

FIG. 5 is a view explaining a method for obtaining a distortion amount. Although the description overlaps with the above description, the method will be described step by step.

<1> The movement of the wire electrode 1 is temporarily stopped at the position where the wire electrode 1 and the workpiece 2 are brought into contact with each other during the retrace. The position where the wire electrode 1 and the workpiece 2 are brought into contact with each other at this time is stored. Note that, in the case of a wire electric discharge machine which controls the movement of the workpiece 2, the movement of the wire electrode means that the wire electrode is moved relatively to the workpiece 2.

<2> The contact between the wire electrode 1 and the workpiece 2 is released by moving the wire electrode 1 in the offset direction.

<3> The position where the contact between the wire electrode 1 and the workpiece 2 is released is stored as a non-contact position.

<4> The wire electrode 1 is returned to the machining path, and the retrace is performed by a predetermined distance in the state where the detection of contact between the wire electrode 1 and the workpiece 2 is neglected. Here, "the detection of contact between the wire electrode 1 and the workpiece 2 is neglected" means that, although the operation of the detection device for detecting contact between the wire electrode 1 and the workpiece 2 is continued, the detection result is not used for control of the retrace, or the detecting operation of the detection device is interrupted.

<5> When the wire electrode 1 and the workpiece 2 are not brought into contact with each other, the normal retrace operation is resumed. The normal retrace operation means the retrace operation in which the detection of contact between the wire electrode 1 and the workpiece 2 is not neglected.

<6> When the wire electrode 1 and the workpiece 2 are brought into contact with each other, the contact releasing operation is performed similarly to the above-described case <2>.

Figure 6A:
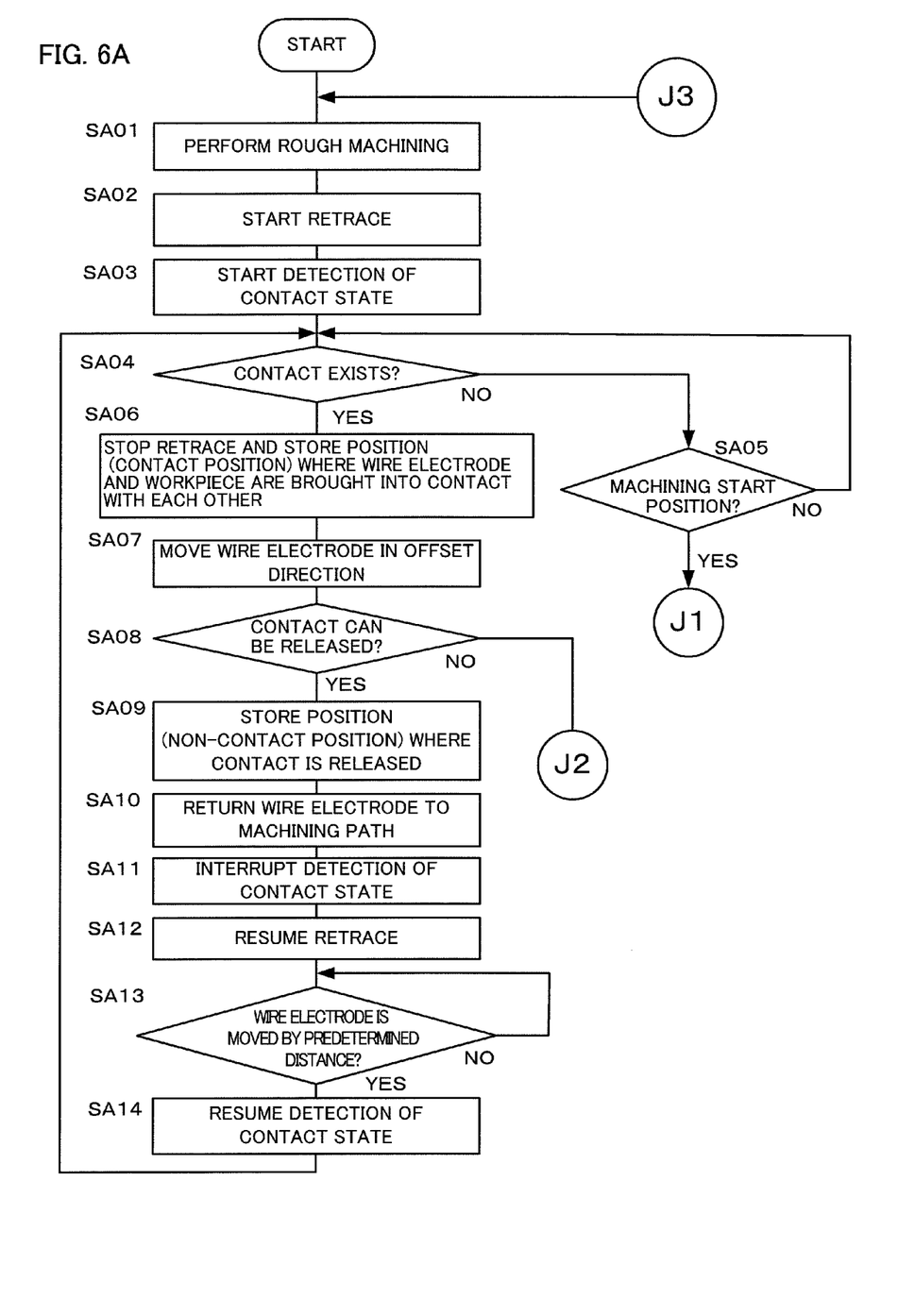
FIG. 6A and FIG. 6B are flowcharts explaining machining processes in which distortion removing machining according to the present invention is performed.
Figure 6B:
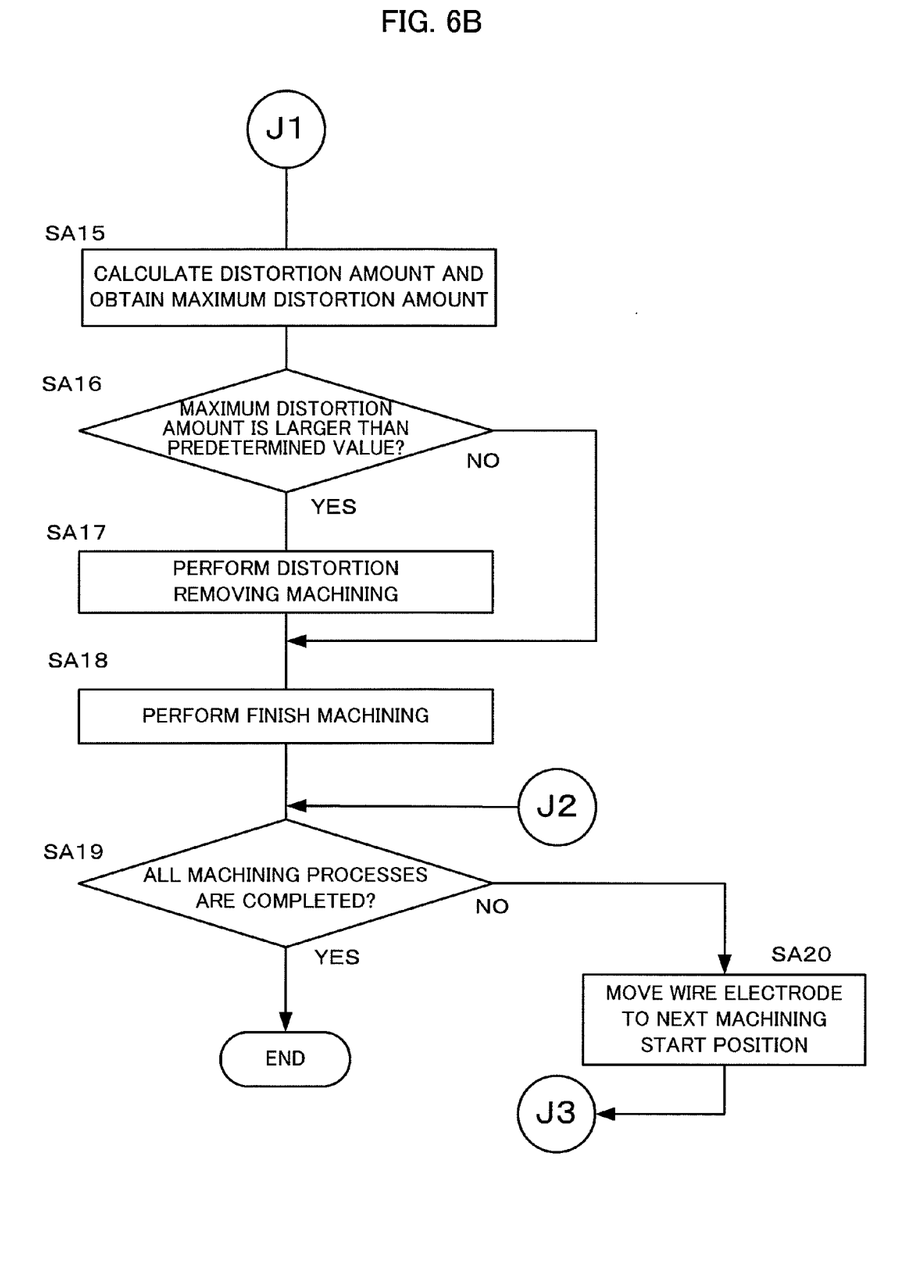

FIG. 6A and FIG. 6B are flowcharts explaining processing in which distortion removing machining according to the present invention is performed. In the following, the processes will be described step by step. Note that the wire electric discharge machine may be configured such that the wire electrode is moved or such that the workpiece is moved. Therefore, the movement of the wire electrode means the relative movement between the wire electrode and the workpiece. In order to facilitate the understanding of the movement described below, description will be given by taking, as an example, a wire electric discharge machine in which the wire electrode is moved relatively to the workpiece.

[Step SA01] Rough machining is performed according to a machining program.

[Step SA02] After the rough machining is ended in step SA01, the retrace is started.

[Step SA03] The detection of a contact state is started.

[Step SA04] It is determined whether or not the wire electrode is brought into contact with the workpiece. When it is determined that the wire electrode is brought into contact with the workpiece (in the case of YES), the process proceeds to step SA06, and when it is determined that the wire electrode is not brought into contact with the workpiece (in the case of NO), the process proceeds to step SA05.

[Step SA05] It is determined whether or not the wire electrode has reached the machining start position. When it is determined that the wire electrode has reached the machining start position (in the case of YES), the process proceeds to step SA15, and when it is determined that the wire electrode has not reached the machining start position (in the case of NO), the process returns to step SA04.

[Step SA06] The retrace is stopped, and the position (contact position) where the wire electrode and the workpiece are brought into contact with each other is stored.

[Step SA07] The wire electrode is moved by a predetermined distance in the offset direction. Here, the offset direction is the direction in which the wire electrode is separated from the machined surface of the workpiece (see FIG. 5). The predetermined distance is set to, for example, about a distance such that, when the wire electrode 1 is moved by the distance, the position of the wire electrode 1 is deviated from a machining groove 3.

[Step SA08] It is determined whether or not the contact between the wire electrode and the workpiece can be released. When the contact between the wire electrode and the workpiece can be released (in the case of YES), the process proceeds to step SA09, and when the contact between the wire electrode and the workpiece cannot be released (in the case of NO), the process proceeds to step SA19.

[Step SA09] The position (non-contact position) where the contact between the wire electrode and the workpiece can be released is stored.

[Step SA10] The wire electrode is returned to the machining path. That is, the wire electrode is moved in the direction opposite to the offset direction in step SA07, and the position of the wire electrode is returned to the machining path.

[Step SA11] The detection of the state of contact between the wire electrode and the workpiece is interrupted.

[Step SA12] The retrace is resumed.

[Step SA13] It is determined whether or not the wire electrode is moved by the predetermined distance. When the wire electrode is moved by the predetermined distance, the process proceeds to step SA14. Note that the predetermined distance is set beforehand.

[Step SA14] The detection of the contact state is resumed, and the process proceeds to step SA04.

[Step SA15] The amount of distortion is calculated. The amount of distortion is calculated on the basis of the difference between the contact position stored in step SA06 and the non-contact position stored in step SA09, and a maximum value among the calculated amounts of distortion is calculated as a maximum distortion amount.

[Step SA16] It is determined whether or not the maximum distortion amount is larger than a predetermined amount. When the maximum distortion amount is larger than the predetermined amount (in the case of YES), the process proceeds to step SA17, and when the maximum distortion amount is not larger than the predetermined amount (in the case of NO), the process proceeds to step SA18. Note that the predetermined amount is set beforehand.

[Step SA17] The distortion removing machining is performed to the workpiece.

[Step SA18] The finish machining is performed to the workpiece.

[Step SA19] It is determined whether or not all the machining processes are completed. When all the machining processes are not completed (in the case of NO), the process proceeds to step SA20. When all the machining processes are completed (in the case of YES), the processing is ended.

[Step SA20] The wire electrode is moved to the next machining start position, the process returns to step SA01, and the processing is continued.

The flowcharts will be additionally described.

The processes of step SA10 to step SA13 correspond to a "machining path return control portion" which forms the wire electric discharge machine performing distortion removing machining according to the present invention.

The process of step SA08 is configured such that, when it is determined that the contact between the wire electrode 1 and the workpiece 2 cannot be released (and when all the machining processes are not ended), the wire electrode 1 is moved to the next machining start position (process in step SA20). Alternatively, the process of step SA08 may be configured such that, when it is determined that the contact between the wire electrode 1 and the workpiece 2 cannot be released, the wire electrode 1 is returned to the machining start position of a component to be machined subsequently to the currently machined component, and the machining process (rough machining process) in step SA01 is performed (that is, rough machining is again performed).

Further, in the case where, in the machining process of step SA20, a plurality of components are successively machined from the workpiece 2 as shown in FIG. 3, when the contact between the wire electrode 1 and the workpiece 2 cannot be released by moving the wire electrode 1 in the offset direction relatively to the workpiece 2, the wire electrode 1 may be moved to the machining start position of a component to be machined subsequently to the currently machined component, or may also be moved to the other machining start position of the currently machined component.

The retrace function provided in the wire electric discharge machine described with reference to FIG. 1 and FIG. 2 will be additionally described.

When the machining shape of the workpiece is complicated and small, the wire electrode 1 and the workpiece 2 may be erroneously brought into contact with each other, unless the wire electrode is moved at a low speed by changing the retrace speed. Therefore, a speed changing portion, which can arbitrarily change the feed speed of the wire electrode 1 at the time when the wire electrode 1 is moved from the machining end position to the machining start position along the machining path in the direction opposite to the machining direction, is provided in the wire electric discharge machine according to the present invention. When the feed speed of the wire electrode 1 is changed by the speed changing portion according to the machining shape, the wire electrode 1 and the workpiece 2 are prevented from being erroneously brought into contact with each other, and thereby the accuracy in identifying the occurrence position of distortion.

Further, in the wire electric discharge machine according to the present invention, when a maximum value of amounts of distortion is calculated for each of machining shapes, contact between the workpiece and the wire electrode is checked at several places of each of the machining shape. For this reason, when contact between the workpiece and the wire electrode can be checked by moving the wire electrode by a predetermined distance, the time required to calculate the maximum value of the amounts of distortion and the retrace time can be reduced.

Further, the wire electric discharge machine according to the present invention, may be provided with a stopping portion which stops the movement of the wire electrode 1 at every predetermined distance in the case where, in the retrace process, the wire electrode 1 is moved from the machining end position to the machining start position along the machining path in the direction opposite to the machining direction. With the stopping portion, not only the amount of distortion can be measured when the wire electrode 1 and the workpiece 2 are brought into contact with each other, but also the amount of distortion can be measured at every predetermined distance along the machining path.

What is claimed is:

1. A wire electric discharge machine for performing distortion removing machining, the wire electric discharge machine configured to machine a workpiece in a machine direction by moving a wire electrode, supported by upper and lower wire guides, and the workpiece relatively to each other, the wire electric discharge machine comprising:

a controller having a memory and a processor;

a wire guide including the upper and lower wire guides and an axial movement control portion, said wire guide connected to the controller and configured, after the machining is ended, to move, relatively to the workpiece, the wire electrode from a machining end position to a machining start position along a machining path in the direction opposite to the machining direction;

a detection member configured to detect contact between the wire electrode and the workpiece at the time when the wire electrode is moved relatively to the workpiece in the direction opposite to the machining direction; and a braking member configured, when the contact between the wire electrode and the workpiece is detected by the detection member, to stop the relative movement of the wire electrode, wherein the memory is configured to store, as a contact position, the position of the wire electrode with respect to the workpiece at the time of detection of the contact, the wire guide is configured to move the wire electrode in the offset direction relatively to the workpiece after the contact position of the wire electrode is stored in the memory, the detection member is further configured, when the wire electrode and the workpiece are brought into a non-contact state, to detect the non-contact state, when the relative movement of the wire electrode is stopped by the brake member, the memory is configured to store, as a non-contact position, the position of the wire electrode with respect to the workpiece at the time of detection of the non-contact state, the wire guide is configured to move, relatively to the workpiece, the wire electrode in the direction opposite to the offset direction from the non-contact position, and is configured to move, relatively to the workpiece, the wire electrode in the direction opposite to the machining direction along the machining path by a predetermined distance while neglecting the detection of contact between the wire electrode and the workpiece by the detection member, the processor is programmed to calculate an amount of distortion of the workpiece from the contact position stored in the memory, and the non-contact position stored in the memory, and the controller is configured to cause the wire electric discharge machine to perform distortion removing machining at the time when a maximum value of the amounts of distortion calculated by the processor is larger than a value set beforehand.

2. The wire electric discharge machine performing the distortion removing machining according to claim 1, wherein the processor of the controller is programmed to arbitrarily change the feed speed of the wire electrode at the time when the wire electrode is moved, relatively to the workpiece, from the machining end position to the machining start position along the machining path in the direction opposite to the machining direction.

3. The wire electric discharge machine performing the distortion removing machining according to claim 1, wherein the brake member is configured to stop the wire electrode at every predetermined distance at the time when the wire electrode is moved, relatively to the workpiece, from the machining end position to the machining start position along the machining path in the direction opposite to the machining direction.

4. The wire electric discharge machine performing the distortion removing machining according to claim 1, wherein the wire guide is configured to move the wire electrode to the machining start position in the case where, when the wire electrode is moved in the offset direction relatively to the workpiece, the contact between the wire electrode and the workpiece cannot be released.

5. The wire electric discharge machine performing the distortion removing machining according to claim 1, wherein the wire guide is configured to move, in machining a plurality of components successively from the workpiece, the wire electrode to the machining start position of a component to be machined subsequently to the currently machined component in the case where the contact between the wire electrode and the workpiece cannot be released at the time when the wire electrode is moved in the offset direction relatively to the workpiece.

* * * * *